Figure 1:
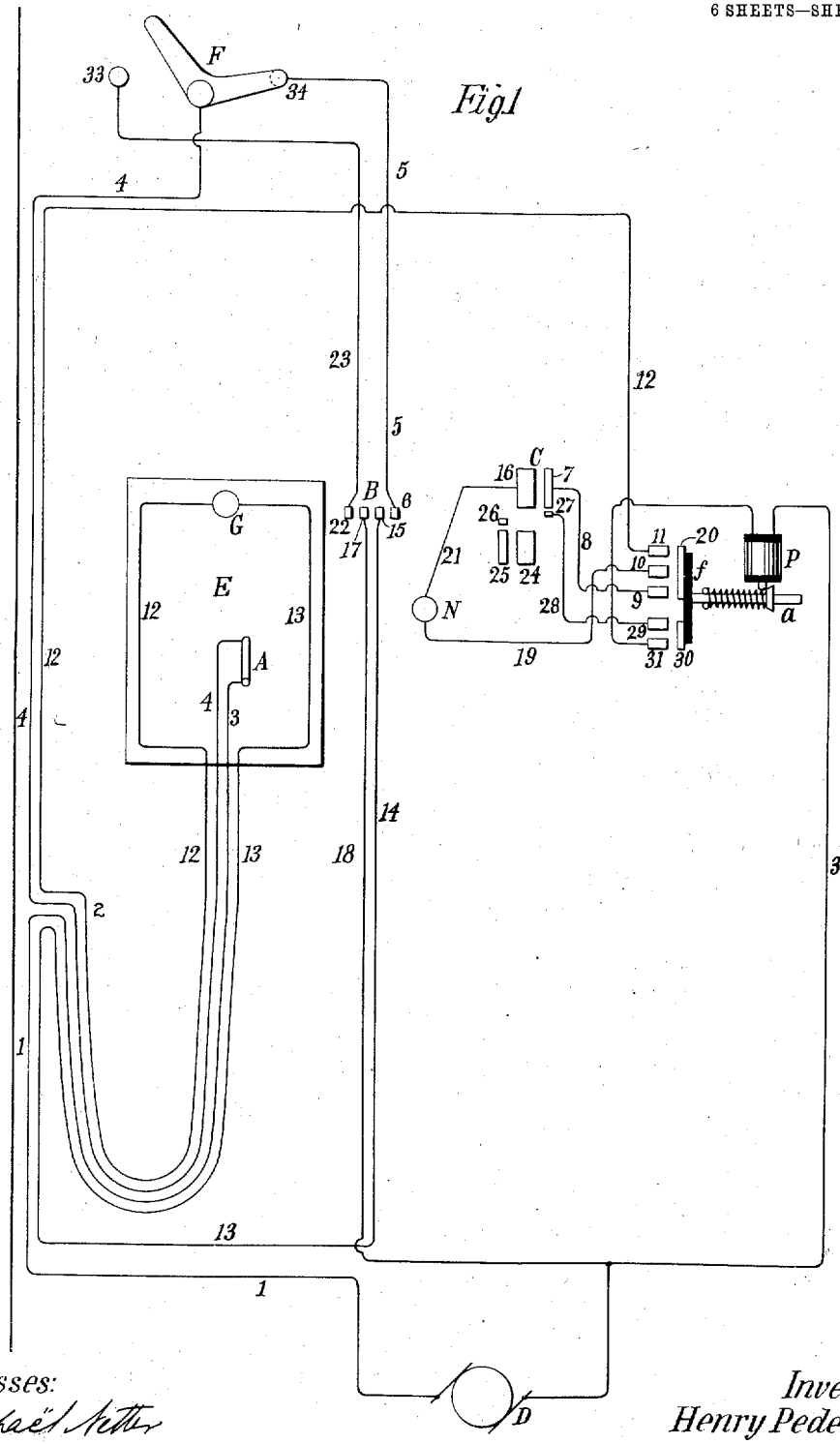

No. 12,313. REISSUED FEB. 7, 1905.

H. PEDERSEN.

APPARATUS FOR OPERATING ELECTRIC SIGNALS FOR ELEVATORS.

APPLICATION FILED JUNE 20, 1902.

6 SHEETS—SHEET 1.

Witnesses:
Raphael Netter
C. D. Morrill

Inventor
Henry Pedersen
by Henry L. Newbury Atty

No. 12,313. REISSUED FEB. 7, 1905.

H. PEDERSEN.

APPARATUS FOR OPERATING ELECTRIC SIGNALS FOR ELEVATORS.

APPLICATION FILED JUNE 20, 1902.

6 SHEETS—SHEET 2.

Witnesses:
Raphael Netter
C. D. Morrill

Henry Pedersen, Inventor by Henry L. Newbury Atty.

No. 12,313. REISSUED FEB. 7, 1905.

H. PEDERSEN.

APPARATUS FOR OPERATING ELECTRIC SIGNALS FOR ELEVATORS.

APPLICATION FILED JUNE 20, 1902.

6 SHEETS—SHEET 3.

Witnesses:
Raphael Netter
C. D. Morrill

Henry Pedersen, Inventor by Henry L. Newbury Atty.

No. 12,313. REISSUED FEB. 7, 1905.

H. PEDERSEN.

APPARATUS FOR OPERATING ELECTRIC SIGNALS FOR ELEVATORS.

APPLICATION FILED JUNE 20, 1902.

6 SHEETS—SHEET 4.

Witnesses:
Raphael Netter
C. D. Morrill

Henry Pedersen, Inventor by Henry L. Newbury Atty

No. 12,313. REISSUED FEB. 7, 1905.

H. PEDERSEN.

APPARATUS FOR OPERATING ELECTRIC SIGNALS FOR ELEVATORS.

APPLICATION FILED JUNE 20, 1902.

6 SHEETS—SHEET 5.

Witnesses:
Raphael Netter
C.D. Morrill

Henry Pedersen, Inventor
by Henry L. Newbury Atty

No. 12,313. REISSUED FEB. 7, 1905.

H. PEDERSEN.

APPARATUS FOR OPERATING ELECTRIC SIGNALS FOR ELEVATORS.

APPLICATION FILED JUNE 20, 1902.

6 SHEETS—SHEET 6.

Witnesses:
Raphael Netter
C. D. Morrill

Inventor
Henry Pedersen
by Henry E. Newbury Atty

No. 12,313. Reissued February 7, 1905.

UNITED STATES PATENT OFFICE.

HENRY PEDERSEN, OF BROOKLYN, NEW YORK.

APPARATUS FOR OPERATING ELECTRIC SIGNALS FOR ELEVATORS.

SPECIFICATION forming part of Reissued Letters Patent No. 12,313, dated February 7, 1905.

Original No. 629,302, dated July 18, 1899. Application for reissue filed June 20, 1902. Serial No. 112,413.

*To all whom it may concern:*

Be it known that I, HENRY PEDERSEN, a citizen of the United States, and a resident of the borough of Brooklyn, city of New York, in the county of Kings, State of New York, have invented certain new and useful Improvements in Apparatus for Operating Electric Signals for Elevators, of which the following is a specification, reference being had to the accompanying drawings, forming a part thereof, in which similar letters and figures of reference designate like or equivalent parts.

My invention relates to improvements in apparatus for operating electric signals for elevators which shall notify the person in charge of an elevator-car upon approaching any floor of the building that a passenger desires that car to stop and take him up or down, as the case may be, and may also indicate to the intending passenger on any floor which of the several elevators is about to stop for him.

My invention or the essential parts thereof can be applied to a single elevator or to a group of elevators.

I provide suitable signals intended to be actuated only when the car is approaching the floor of the building upon which an intending passenger has operated a push-button or other suitable device, such signals being located in each elevator-car and also over the doorway of each of the several elevator-shafts of the group upon each floor.

The traveling elevator-car carries no contact points or brushes or other moving parts of the apparatus directly attached to it; but I suspend a slow-moving tube in the shaft within which each elevator-car travels, which tube shall move relatively and proportionately with the movement of its corresponding elevator-car, this movement being obtained by a proper connection and reduction-gear, preferably attached to the overhead wheel or drum from which the car is suspended. This tube contains four insulated wires, that number being sufficient in my system for any number of floors and for each of any number of cars composing the group. Corresponding to each floor of the building a contact plate or device is attached to each tube, bearing upon its face four contact-points, which are connected directly to the four several wires carried by the tube, corresponding contact-points of each contact device being connected together by separate wires. Opposite each of the moving tubes and fixed upon the inner face of the shaft is a strip or rail extending from the top to the bottom of the building, having upon its face a contact plate or device corresponding to each floor of the building and so disposed as to come into sliding contact with its corresponding plate or device attached to the traveling tube. Each of these devices attached to the inner wall of the shaft bears several contact-blocks—for instance, six in number—arranged in a manner similar to that shown in Fig. 10 and in Figs. 1 and 12 (designated as C) and for the purposes hereinafter described are sufficient for each device to operate my system as applied to any number of floors and any number of elevators constituting the group. Each of these contact devices is so disposed upon the strip as to be in contact with its corresponding plate or device upon the traveling tube only when the elevator-car is approaching the floor to which it corresponds, traveling either up or down, as the case may be. The strip to which the fixed or local devices are attached may be continuous from the top to the bottom of the building, or it may consist, preferably, of a short section at each floor set into recesses, if desired. The length of each section can be measured by the distance which the corresponding block or device on the tube may travel, the intermediate portions of the strip being cut away. By means of the slow-traveling tube and attached devices I avoid the imperfect connection which would be made by a sliding contact attached to a rapidly-moving elevator-car, and I am able to use relatively smaller contact plates or points and to accomplish the desired ends by a new arrangement of parts and a new theory of construction requiring but a small number of wires and a simple and inexpensive apparatus.

Figure 2:
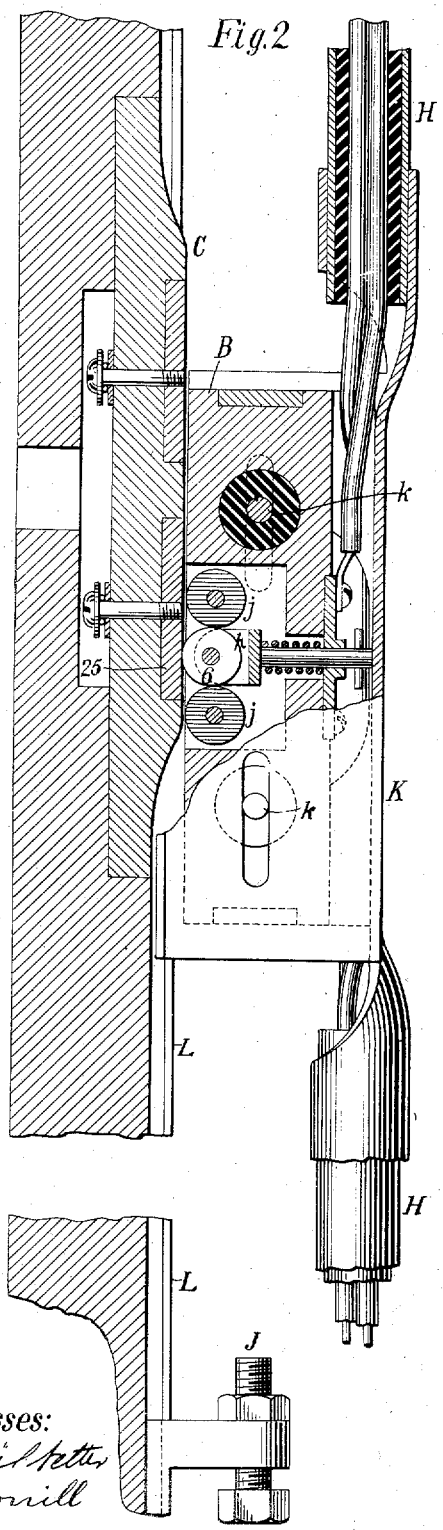
Figure 3:
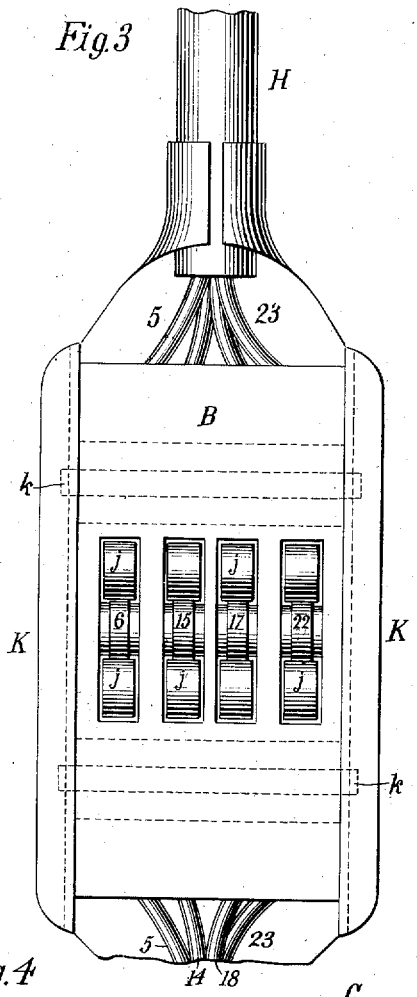
Figure 4:
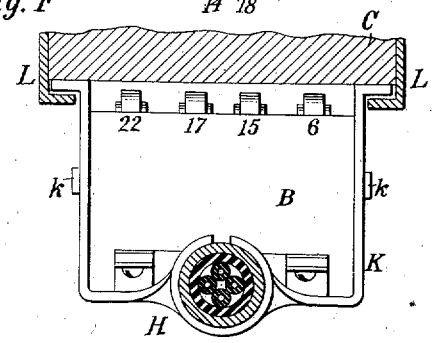
Figure 5:
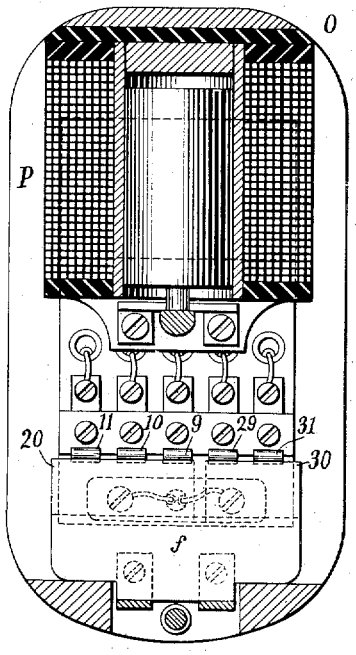
Figure 6:
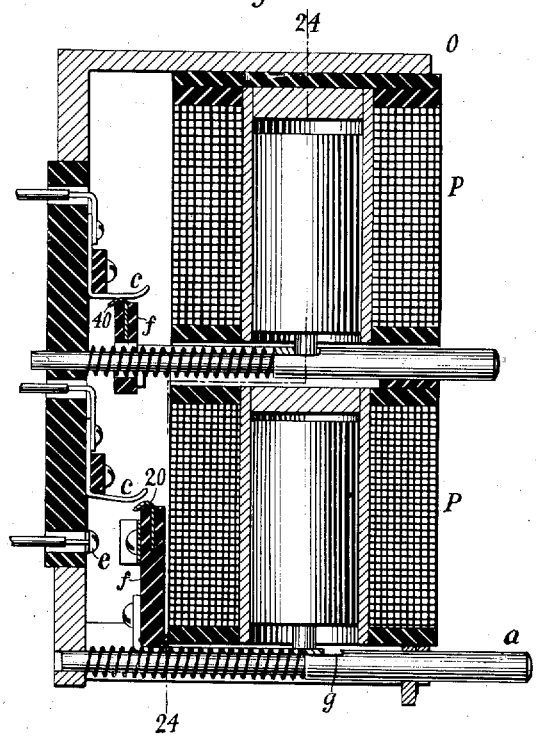
Figure 7:
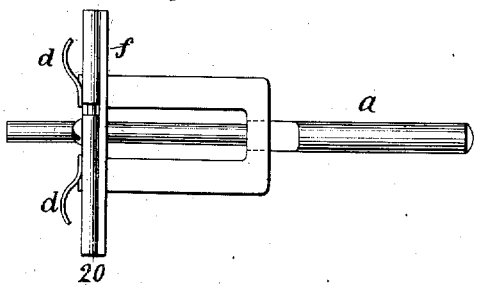
Figure 8:
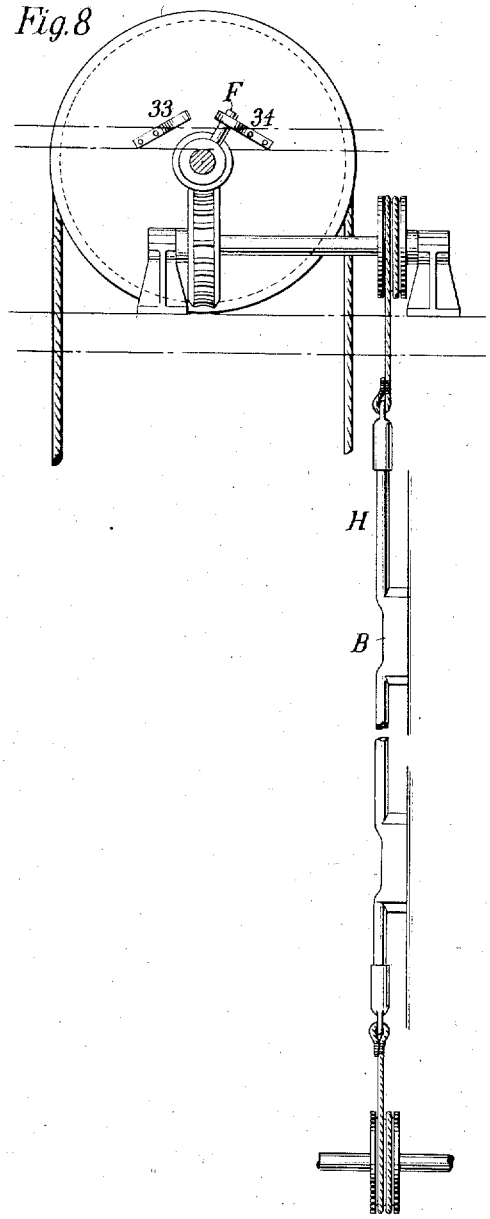
Figure 9:
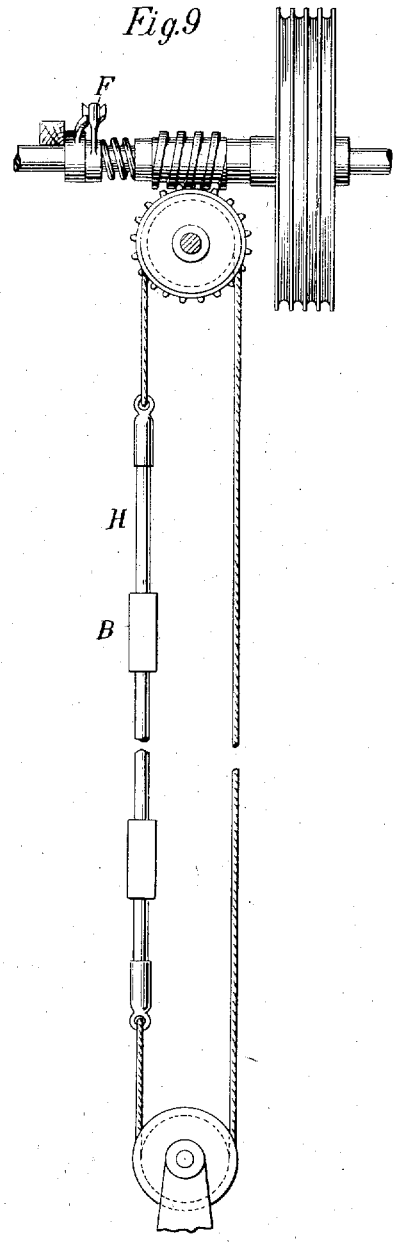
Figure 10:
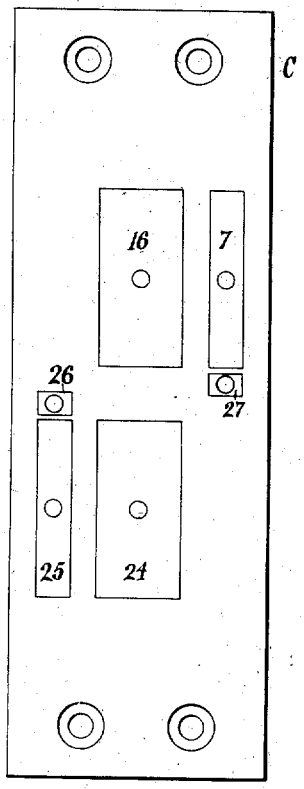
Figure 11:
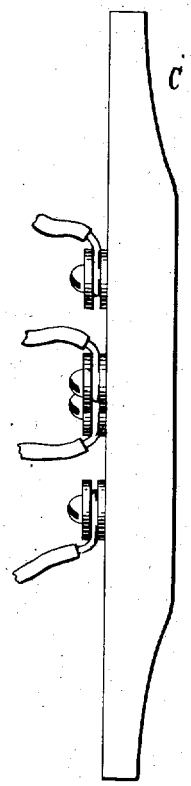
Figure 12:
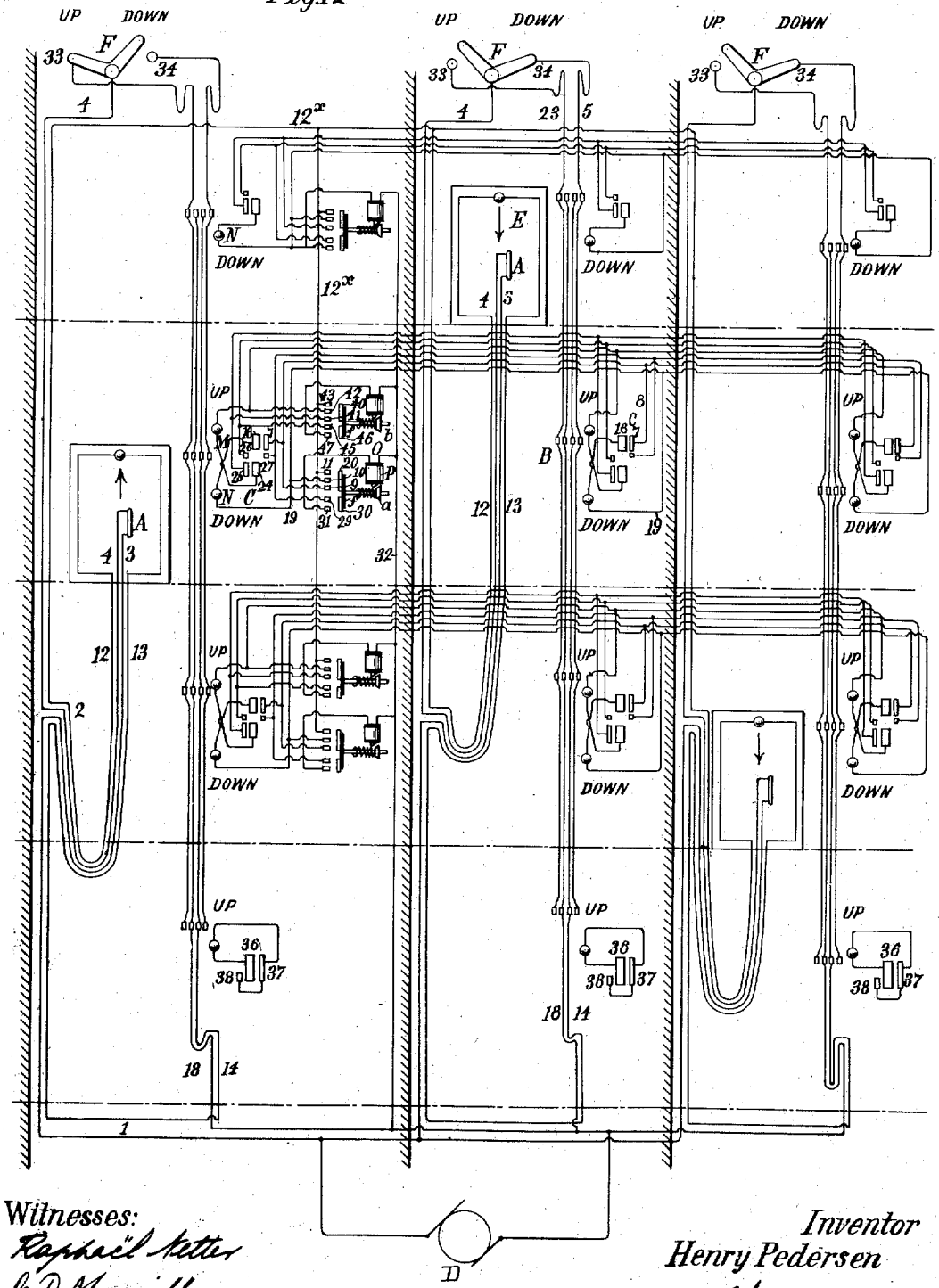

In the accompanying drawings, Figure 1 is a plan of the arrangement and connection of the several parts of the system, forming a complete circuit upon a single floor of the building, for one elevator only, supposed to be moving in a downward direction. Fig. 2 is a vertical section of the traveling tube and of one of the contact plates or devices carried by it. Fig. 3 is a front elevation of the contact plate or device carried by the traveling tube. Fig. 4 is an end view of the same, showing also the inclosing box or frame K. Fig. 5 is a vertical sectional view of the push-button box or circuit-closing device O on the line 24 24 of Fig. 6. Fig. 6 is a vertical section of the push-button box O, showing both the up and down circuit-closing sections. Fig. 7 is a horizontal skeleton plan of one of the push-button or circuit-closing plungers. Figs. 8 and 9 show the mechanical arrangements of parts which may be used in suspending and operating the traveling tube. Fig. 10 shows in vertical elevation the local contact plate or device fixed to the side of the elevator-shaft, and Fig. 11 is an edge view of the same. Fig. 12 is a plan or diagram of the arrangement of parts, wiring, and connections for a system of elevators, showing three elevators, one of which is represented as ascending and two as descending in a building consisting of four floors, including the top and bottom floors.

To illustrate the theory and method of the operation of my invention, I will describe the action of the several parts of my system, taking, for example, my apparatus as applied to a single elevator-car moving in a downward direction, the plan of which is shown in Fig. 1.

We will suppose that the car travels in its journey from the top to the bottom of the building a distance of two hundred feet. I would suspend within the elevator-shaft a rod or hollow tube carrying the four insulated wires, connected as hereinafter described, the weight of the rod being supported by a cable running over a wheel at the top of the shaft, and I would have the movement of the rod preferably about one seventy-fifth or one one-hundredth of the entire movement of the elevator and corresponding to it in direction; but this ratio may be varied to suit the requirements of each case.

In Fig. 1, supposing that the elevator E is moving downward from the top of its shaft and assuming that an intending passenger is upon any floor of the building, such as the third, and wishes a car to take him to a lower floor of the building, and that this person has operated a push-button or other suitable device located at a convenient place on each floor by pressing the push-button marked "Down," as shown on the third floor, Fig. 12, no signal is shown to the operator in the elevator-car or to the waiting passenger until the car approaches the floor upon which the call-button has been pushed. Before the elevator-car has reached this third floor, and so that the operator has still a convenient length of time in which to stop the car at that floor without a jar, the moving contact plate or device, such as B, corresponding to the third floor, comes upon the upper portion of the fixed or local contact plate or device C, such as is shown in Fig. 1, corresponding to the third floor, and fixed upon the strip upon the side of the elevator-shaft. At this moment the lamp or other signal in the car is actuated, indicating to the operator that he must stop at the floor which the car is then approaching. This signal in the elevator-car is then upon a closed electrical circuit, one end of which is connected directly to the dynamo or other source of current. From the dynamo (indicated at D) a wire 1 is led, preferably, to the middle of the building at 2, and from thence through a flexible cable 3 to the elevator-car E, connecting with a switch or circuit breaking device in the car, such as A, (shown in Figs. 1 and 12,) for the purpose hereinafter to be described, and which may be used to break the circuit at the will of the operator. From this switch or device A another wire, 4, is led from the elevator-car E through the flexible cable 3 to a switch F operated as hereinafter described and which I preferably place at the top of the elevator-shaft. Through this switch F, I obtain connection with the wire 5 contained in the traveling tube or circuit-closer, which wire is directly connected with one of the sliding contact pieces or points 6 in each of the contact plates or devices attached to the tube and corresponding in position on each device in the relative position shown. At the moment when the car E is approaching the third floor of the building the moving tube has taken a relative position within the shaft, such that the contact-point 6 upon the device B of the tube, corresponding to the third floor, is in contact with the upper edge of the contact-block 7 of the local device C attached to the side of the shaft and corresponding to the third floor. The connection is made by this sliding contact between 6 and 7, thence through the fixed wire 8 to the point 9 of the down-section of the push-button box or circuit-closing device, and as button *a* of this device has been pushed connection is made from this point 9 by the strip 20 to the point 11 of the same push-button. This point 11 is connected to a wire 12, which connects all of the similar points 11 11 43 43 in Figs. 1 and 12 of both up and down sections of all the push-button devices in the system, and then leads through the flexible cable to the lamp or other signal G in the elevator-car E. From the other terminal of this car-lamp G another wire, 13, leads out through the flexible cable to the traveling tube corresponding to the moving car, and by means of a wire 14 in the traveling tube, which connects all of the similar and correspondingly-situated contact-points 15 15 to the contact-point 15 on the plate or device B of the traveling tube corresponding to the third floor. At this moment this moving contact-point 15 is in sliding contact with the broad block 16 of the fixed or local device C corresponding to the same floor. This contact-block 16 is broad, so that the sliding contact-points 15 and 17 are both upon it at the same time, and by means of it connection is made between the point 15 and the point 17, which is directly connected by the wire 18, carried by the traveling tube, to the other pole of the dynamo or source of the electric current D, thereby completing the circuit and operating the signal in the elevator-car E. At the same time another circuit is completed, which will operate the lamp or other signal over the doorway of the car which is approaching the third floor and which will indicate to the waiting passenger that the car in that shaft is descending and will stop at the third floor to take him downward—viz., at the same moment as before described. When the car is approaching the third floor, this other circuit is closed leading from the dynamo D, through the wire 1, through the flexible cable, through the circuit-breaking device A in the car, and again from the car by the wire 4 to the switch F, which is placed overhead at the top of the shaft, and by means of this switch through the wire 5, as before, to the moving contact-point 6 upon the device B, attached to the traveling tube, this contact-point 6 being then in sliding contact with the contact-block 7 of the local device C, which contact-block 7 is connected by a wire to the point 9 in the down section of the push-button device on the third floor. The portion of the circuit so described thus far is used in common to operate the signal in the elevator-car and to operate the signal over the elevator-door on the third floor. As the intending passenger has pushed the button *a* on this floor, the point 9 is in direct connection, by the strip 20, with the point 10 of the same push-button device, and this point 10 is in connection, by a wire 19, with the lamp or other signal device N at the doorway of the elevator-shaft. From this lamp or other signal N connection is made through the fixed wire 21 to the broad block 16 of the local contact device C, which is at this moment in sliding contact with the moving point 17 of the corresponding device of the traveling tube, and this point is directly connected to the wire 18 of the traveling tube, which leads to the other pole of the dynamo or other source D of the electric current. Both of these signals will continue in operation until the moving contact-point 6 upon the device B, attached to the traveling tube, shall have moved downward, corresponding to the movement of the elevator-car, and shall have moved off from the contact-block 7 of the local device C, thereby breaking the circuit, or until the moving contact-point 17 shall have moved off from the contact-block 16. Both of these breaks in the circuit preferably occur at the same time, and the contact-blocks 7 and 16 are of such size and are so placed that the circuits shall be broken and the signals shall cease to be operated at about the time when the corresponding elevator-car reaches the third floor, at which the button has been pushed and the signal has been operated. After the moving contact-point 6 has moved off of the contact-block 7 of the fixed plate C and the signals in the car and over the doorway of the elevator have ceased to operate the moving contact-point 6 comes upon the small block 27, which is insulated from the block 7, and thereby closes an electrical current through a solenoid-coil, such as P, which operates as an electromagnet. The end of the core, which has dropped into a suitably-formed recess *g* in the plunger of the push-button *a*, is thus adapted to hold the plunger in its pushed-in position and to maintain the strips 20 and 30 in contact with the points 9, 10, 11, and 29 31. When the electromagnet is energized, its core is withdrawn, thereby releasing the plunger, which is forced by a coil-spring or other suitable device to resume its normal position, disengaging the strips 20 and 30 from the contact-points 9, 10, 11, and 29 31 and leaving the plunger of the push-button *a* ready to be operated by the person who may next wish to signal a car moving downward. This momentary electric circuit through the solenoid-coil comes from the dynamo D by the wire 1, through the cable 3 and the switch A in the elevator-car, and thence by the wire 4 to the overhead switch F, which is then in contact with the point 34, Fig. 8, and thence by the wire 5 to the contact-point 6 of the device B of the traveling tube H. This point 6 is at this moment in contact with the small block 27 of the device C. From the block 27 the wire 28 leads to the point 29 of the down-section of the circuit-closing device or push-button box, and as the plunger of the down-section of this box is supposed to have been pushed in the electrical connection is made by means of the strip 30 between the points 29 and 31. From 31 a wire leads through the solenoid-coil P and from thence directly to the other pole of the dynamo D.

The foregoing description of the operation of the several parts of my system applies also to Fig. 12 and may be traced in reference to the middle elevator E of that drawing, represented as descending and approaching the third floor of the building.

The circuit-closing device or push-button box on each floor consists of two identically similar sections, both of which are connected with the single signal in the elevator-car by the similar points 11 43 and the wire 12; but otherwise the two sections are independent and distinct—the up-section connected with the up-signal on the floor and with the up-blocks 25 and 26 of the device C and operating only when the button *b* (marked "Up") has been pushed in, and the down-section similarly connected to operate the down-signal.

From the foregoing it will be seen that the contacts 6 of each of the plates or devices B, which are attached to the tube or rod H, are connected together in "series," that the contacts 15 of each of such plates are connected in series, that the contacts 17 of each of such plates are likewise connected in series, and also that this is the case with the contacts 22 of each of these plates or devices B, and, as shown, there are four contacts for each device and four conductors connecting the corresponding contacts in series, two of the conductors terminating at the upper one of the devices B and the other two terminating at the lower one of such devices. It will also be seen that, as shown, the contacts 15 and 17 are electrically connected as they move over the contact-block 16 of the fixed or local contact device C and that this is also the case as the moving device B moves over contact-block 24 and that contacts 15 and 17 may be said to be common to both blocks 16 and 24 of the local device C.

It will be observed that the devices or plates B, attached to the traveling rod or tube H, move back and forth in substantially one plane and that all of the contacts of each of such movable devices B are in frictional contact with all of the contact blocks or points of each of the corresponding local devices C as such devices B move over the local devices C and also that the contacts of each of the devices B may be said to be arranged in two sets, one contact, 6, being in one set and contact 22 being in the other set and contacts 15 and 17, as shown, being common to both sets through the arrangement of contact-blocks 16 and 24 of device C; also, that contact devices C are local or substantially fixed relatively to the floors of the building, and the contacts or contact-blocks of each of such local devices may be said to be made up into two sets, contact-blocks 7 and 16 for signaling purposes comprising one set and with contact 27 comprising a set for both signaling and detent-releasing purposes, while for these two purposes contact-blocks 24, 25, and 26 comprise another set, and for signaling purposes alone blocks or contacts 24 and 25 form a set.

In applying my system to a group of elevators, as shown in Fig. 12, only one circuit-closing device, as O, is needed on each floor, and a signal will be operated in the car and over the doorway of the car which next descends after the down-button has been pushed. This is accomplished by means of the connections, as shown in Fig. 12. Each of the several down-signals on the same floor is connected on the one side by one of the similar wires 21 to the contact device C in the shaft of its corresponding elevator, and the other poles of all of these several down-signals on the same floor are connected in multiple to the point 10 of the down-section of the circuit-closing device on that floor by the wire 19 and its several branches. All of the similar blocks 7 of the devices C corresponding to the same floor are connected in multiple to the point 9 of the down-section of the circuit-closing device on that floor, and the similar blocks 27 are connected in multiple to the point 29 of the circuit-closing device O. The multiple connections to the corresponding points 42, 41, and 45 of the up-section of the circuit-closing device are similarly made.

The multiple connections made from the several points of the circuit-closing device and the fixed device C to the similar parts of the system are all on the same floor, my system requiring but six cross-wires on each floor to include any number of elevators, connections being made to these six wires from the proper parts at each of the several elevator-shafts to enable me to operate both up and down signals, the wiring on each floor being electrically independent except for the two trunk-wires $12^{\times}$ and 32, which connect all floors of the building, the points 43 and 11 of the up and down sections of the circuit-closing devices on all floors being connected to the same wire $12^{\times}$ and thence leading to the signal in the elevator-car, and the wire 32 connecting in multiple the coils of the solenoid-magnets of both up and down sections of all circuit-closing devices.

One circuit-closing device or push-button box on each floor, connected in multiple, as shown in Fig. 12, is sufficient; but for convenience I may place several on each floor of the building. This will not require any change in my system or in the arrangement of parts; but the several similar parts of all circuit-closing devices on the same floor should be connected together.

The up-section of the circuit-closing device O is not represented in Fig. 1; but when the car is moving upward the switch F is thrown in the opposite direction to connect the wire 4 with the point 33, Fig. 8, and thence by means of the wire 23 to the point 22 of the device upon the traveling tube. The wire 5 and point 6 of the device on the traveling tube are now entirely "dead" or out of circuit, and though the point 6 may be upon either block 7 or 27 of the local device C no effect is produced in operating the signals; but the point 22 in ascending comes upon the blocks 25 and 26 and the points 15 and 17 come upon the block 24 and produce the desired results, one pole of the up-lamp M being connected directly to the block 24 by a wire fixed thereto and the other pole of the lamp M' being connected by a wire to the point of the up-section of the circuit-closing device corresponding in relative position to the point marked "10" of the down-section. The circuit operating the car-lamp in an ascending elevator after the up-button *b* has been pushed is then as follows: From the dynamo D by means of the wire 1, through the cable 3 and the circuit-breaking device A, and by the wire 4, through the overhead switch F to the point 33, and by means of the wire 23 to the point 22 of the device of the traveling tube. When the car is ascending, the point 22 will come upon the block 25, and by means of this sliding contact the circuit will continue by means of a wire from the block 25 to the point 41 of the up-section of the circuit-closing device, and this is connected by the conductor 40, attached to the plunger of push-button *b*, to the point 43. The wire 12× leads from the similar points 11 and 43 in both the up and down sections of the circuit-closing devices on all floors to the lamp in the car, and thence by the wire 13 to the point 15 of the device B on the traveling tube corresponding to that car. As this is now upon the block 24, connection is made with the point 17, and from thence direct to the other pole of the dynamo D. The circuit operating the up-lamp over the elevator-car door continues the same as the circuit operating the elevator-car lamp from the dynamo D to the overhead switch F, thence by means of the point 22 to the block 25, and from thence to the point 41 of the up-section of the circuit-closing device. From thence connection is made by the conducting-strip 40 with the adjacent point 42, which is connected by a wire affixed to one pole of the up-lamp on this floor. From the other pole of this up-lamp a wire leads directly to the block 24 of the local device C, and from this block 24 sliding contact is had with the point 17 of the movable device B of the traveling tube, which is connected by the wire 18 to the other pole of the dynamo. The solenoid-circuit to release the plunger of push-button *b* of the up-section of the circuit-closing device is the same as that of the lamp-circuits from the dynamo through the switch F to the point 22, and by means of the sliding contact connection is made through the small block 26, which is connected directly to the point 45 of the up-section of the circuit-closing device corresponding in position to the point 29 of the down-section, and from this point 45, by means of the conducting-strip 46, attached to the plunger of push-button *b*, to the point 47 and from this through the solenoid-coil to the dynamo D.

On the top floor of the building no up-button is needed, and consequently that portion of the circuit-closing device may be omitted. When the down-button has been pushed on the top floor, the lamp over the elevator-car door on that floor should indicate which of the cars is approaching the top and will next go down. Consequently the lamps marked "Down" can be connected directly to the up-blocks—such as 24, 25, and 26 of the local device C on that floor, as shown in Fig. 12—and be operated by the ascending car before the switch F is reversed. I prefer to do this rather than to connect the down-lamps to the blocks—such as 7, 16, and 27 of the devices C on that floor—which would necessitate reversing the switch F some time before the car E arrives at the top floor of the building. If it is not desired to operate the signal in the elevator-car when approaching the top floor, the connection in the circuit-closing device between the wire 12× and the point 43 or 11 of the device may be omitted.

On the bottom floor of the building no push-button is ordinarily needed. Consequently that part of the apparatus may also be omitted. However, it is desirable to operate a signal over the door of the car which is then descending and will be the next car to go up, and this should continue in operation until the car starts upward. This can be accomplished by connecting the lamp marked "Up" to the down-circuit and making the blocks, such as 36 and 37, unusually long, so that the points 6 and 17 will still remain upon these blocks while the car is stopping at the bottom floor, as shown in Fig. 12. No signal in the car will be operated; but the circuit operating the signal over the car-door will then be as follows: from the dynamo D by the wire 1 through cable 3 and the switch A in the car to the overhead switch F, then in contact with the point 34, and thence by the wire 5 to the point 6, which will be in sliding contact with the block 37. From 37 a fixed wire leads through the lamp which is over the car-door on the ground floor to the block 36, and from thence by the sliding contact with point 17 through the wire 18 to the dynamo D. If, however, the switch F should be operated before the car starts upward, the lamp on the bottom floor would still continue to burn, the circuit being continued from the switch through the point 33 of the wire 23 to the point 22 in sliding contact with the block 38 through a wire connecting 38 to 37 or from 38 directly to the lamp, and thence through the lamp to the block 36, which is in sliding contact with the point 17, and thence by 18 to the dynamo D.

Fig. 2 represents a portion of the traveling tube or rod H containing or bearing the four several wires 5, 14, 18, and 23. These wires are severally connected to the contact-points 6, 15, 17, and 22. One of these contact-points is shown in section at *h*, Fig. 2. I prefer to construct them in the form of wheels free to revolve while in sliding contact and so arranged upon coiled-spring thrust-bearings that they may adjust themselves to any unevenness in the local contact device C. As a mechanical device to insure the efficient action of the wheel *h* in its revolution and thrust motion I place it between two other wheels made of hard rubber or other non-conducting material, such as *j j*, free to revolve upon axes parallel to that of *h*. This entire mechanism or system of moving contact-points I prefer to place in a frame or box K, having openings in its surface plate, through which the contacts 6, 15, 17, and 22 may protrude.

The outer surrounding frame K of this device B, I prefer to make of metal, having lips on either side of its face, adapted to engage with projecting lips or grooves, such as L, (shown in Fig. 4,) formed by the metal sides or frame inclosing the strip upon which the local device C is secured.

There is a moving device, such as B, for each floor of the building, attached to the traveling tube corresponding to each elevator, each device B being so relatively adjusted that the contact-points 6, 15, 17, and 22 shall be in contact with the blocks upon the fixed or local devices corresponding to any floor of the building only when the corresponding car is approaching that particular floor. This result may be obtained by a proper placing and adjustment of the moving device B or of the local device C. I prefer to have the local device C near or opposite the floor to which it corresponds, so that the direct connections with the lamp and push-buttons on that floor may be conveniently made.

Fig. 10 shows the arrangement of parts of the local contact device C as viewed from the same direction as shown in Figs. 1 and 12. I make the base of device C of porcelain or any other non-conducting material, upon which are affixed the blocks or strips of conducting material, such as 7 16, &c., which are connected by wires with other parts of the apparatus, as hereinbefore described, and are adapted to come into sliding contact with the points, such as 6, &c., of the moving device B.

The traveling tube H may be raised or lowered by any suitable means; but I prefer to use a cable running over a pulley or wheel at the top of the building connected by a worm-gear with the shaft of the pulley over which the cables supporting the car pass. This shaft is also made to carry a loose friction-clutch device operating a switch F and throwing it in contact with the fixed plates 33 and 34, according to the direction in which the shaft may be revolving, or the switch F may be operated by any equivalent means.

I prefer to make the tube H of hollow metal pipe; but I may also use a rod or shaft adapted to carry the four insulated wires upon its face or in grooves. If the traveling tube or rod H is of considerable length, it may happen that variations of temperature will cause a lengthening or shortening of the tube, which may tend to throw the traveling device B out of its proper position in relation to its corresponding local contact device C either too far up or down. To overcome this difficulty, I make the outer frame or shell K of the traveling contact device separate from the device B itself; but they are adapted to fit together snugly. The device B is fastened to transverse bolts or rods, such as *k*, which fit into slits in the sides of the outer frame or shell, being maintained in the proper position by spiral springs or other mechanical means, which may press sufficiently against washers at the ends of the bolts to hold the device B in its proper relative position. Attached to the strip or to the side of the elevator-shaft I place an adjusting stop or bolt J at either or both ends of the path of the extreme travel of the movable device B on each floor, which stop J can be so adjusted that at each time the device B ascends or descends it may come in contact with one of these stops J, and by this means the position of B may be shifted or adjusted within its outer frame K by forcing the bolts *k* upward or downward in the slots provided to receive them. By this means an automatic adjustment is possible which will overcome any small variation in position which may be occasioned by change of temperature, sudden shock, or accident. The points of the movable device, such as 6, &c., are held in contact with the contact-blocks of the local devices C by the interlocking lips of K and L; but I may accomplish the same result by forcing the traveling tube H to move within fixed guides suitably placed. In order to facilitate the adjustment and movement of the movable device B with reference to its frame K, the connections between the wires 5, 14, 18, and 23 of the tube and the points 6, 15, 17, and 22 may be made by allowing slight movement of the surfaces in contact at the screw-joint, or small worm-coils may be made of each of the several wires within the several frames K and adjacent to the fixed connections.

I can use a mechanical pointer or other device to indicate the location of the elevator-car, operated by direct mechanical connection with the traveling tube by means of rack and pinion or equivalent device operating an indicator on any desired floor of the building, such as the ground floor; but I do not claim this as any part of my invention.

Figs. 5 and 6 show the arrangement of the parts which I preferably employ in constructing the push-button box or circuit-closing device O. The essential parts of this device are the three contacts, such as 9, 10, and 11, connected by wires with various parts of the apparatus, as hereinbefore described, so arranged that the points 9, 10, and 11 are mutually connected when the button *a* has been pushed. The circuit-closing device O also includes a device for maintaining this contact when the button has been pushed, such as a rod or catch-pin fitting into a recess *g*, such as is represented in Fig. 6. After the desired signals have been operated and the purpose for which the button has been pushed has been accomplished I provide a means for releasing the button by withdrawing the catch from the recess *g* by constructing it of suitable metal and placing about it a coil through which the electric current may pass and operating as an armature of an electromagnet operates will release the button, which is then forced to resume its normal position by a coil-spring or other suitable device, thus breaking the electric connection between 9, 10, and 11 by withdrawing the conducting-strip, such as 20. The circuit through the solenoid-coil or electromagnet is closed only when the button is pushed, and connection is thus made by the strip 30 between the contacts 29 and 31 of the circuit-closing device, which are suitably connected with the other parts of the apparatus, as hereinbefore described. The conducting-strips 20 and 30 are insulated from each other and are mounted upon a non-conducting base *f*, as seen in Fig. 5. The points 9 10 11 and 29 31 may be formed in the shape of leaf-contacts or flat springs *e*, adapted to engage closely with the conductors 20 and 30 when the button *a* has been pushed. Instead of the push-button or plunger, such as *a*, I may use a lever and eccentric or equivalent mechanical device.

When the cars are not running regularly or frequently, as at night, it might not be sufficient to operate the signals upon the plan contemplated by my system as hereinbefore described; but I may so construct the circuit-closing device O that when the button *a* or *b* has been pressed the contact-points, such as *d*, Fig. 7, carried by the button will come in contact with points *e*, Fig. 6, suitably placed, and thereby close an independent circuit, which will include both up and down buttons in all push-button boxes, which may be simply connected to operate a bell or lamp upon the ground floor or other suitable part of the building, which signal will contiue to operate until a car has reached the floor at which the button has been pushed, when the solenoid-circuit corresponding to that floor will be closed by the sliding contact between the point 22 and the block, such as 26, thereby releasing the catch and allowing the button to resume its normal position.

I have thus described the construction and operation of my system, which has for its advantages simplicity of construction, cost, operation, and maintenance, requiring but two or four wires contained in a flexible cable leading to the elevator, four wires contained in or carried by the traveling rod or tube H, one wire leading from the dynamo to all floors of the building, to which the solenoid-circuits of all of the push-buttons are directly connected in multiple, and one wire connecting together the similar points 11 43 of the up and down sections of all push-button boxes or circuit-closing devices and then leading to the lamp in the elevator-car by one of the wires of the flexible cable. In addition to these is required only a single circuit-closing device for each floor, connected, as shown in Fig. 12, with lamps and local contact devices C corresponding to that floor. By this means I avoid the use of the large number of wires and complicated connections heretofore required, involving enormous expense and great weight of wiring to be suspended from the car and in the elevator-shaft. The essential parts of my invention consist of the arrangement of wires and contacts to accomplish this purpose as hereinbefore shown; but I may use alternative constructions or arrangements in some parts thereof not affecting the novelty of my invention.

The traveling tube H may be adapted to move vertically or horizontally in any desired direction, distance, or speed relative to the movement of the elevator-car, and my invention may be adapted to a system of signals for use upon tramways and sections of railway. The sliding contacts may consist of wheels, brushes, or fixed plates adapted to come into contact with insulated blocks or plates of conducting material; but I do not contemplate the use of a continuous conductor commonly known as a "trolley." The signal to be operated in the elevator-car and upon the several floors of the building may consist of an electric lamp or bell or some equivalent audible or visible device, such as a drop-shutter. It is not essential that there should be separate signals for "Up" and "Down" over the doorway on each floor of the building; but one signal might be adapted as an indicator for both upward and downward movement of the elevator-car, and in such case the connection may be made to this single signal by wires from both blocks 16 and 24. The signal over the elevator-car door may also be connected, as shown, to the block 16 of the local device C corresponding to its floor or may be connected upon the same circuit as the signal in the elevator-car. The blocks 16 and 24 of the local device C need not be insulated from each other, but may be united to form a single long block, as the circuits will be broken and the signals cease to operate whenever the points 6 and 22 shall move off from the blocks 7 and 25; but by breaking the contact between the point 17 and the blocks 16 or 24 at the same moment that the break occurs between the point 6 and the block 7 I avoid an objectionable spark which might otherwise occur at the time of the break. The flexible cable leading to the elevator-car may be connected to the middle of the building or some other suitable place, and the connections with the wires carried by the traveling tube H may be made at this place or elsewhere, as I may deem convenient, such as the top or bottom of the building, and the switch F may be operated at the top of the building, as described, or in any other convenient position by any suitable mechanical or electrical means.

The circuit-breaking device or switch A, located in the elevator-car, may be omitted without affecting the novelty of my invention; but I may use it for convenience. When the car is filled or is running as an "express" or for any reason it is not desired to stop it or to operate the signals, the person in charge of the car may break the connection between the wires leading to and from such device, thereby cutting that car out of all circuits and leaving the signals to be operated by the next succeeding car.

I am aware that other systems and devices have been used to operate indicators in the elevator-car and upon the several floors of a building when one of the cars is approaching the floor in the direction desired, and I am also aware that electric lamps or bells have been used as such indicators or signals, and I do not claim the same, broadly; but

What I claim as new, and desire to secure by Letters Patent, is—

1. In an elevator signal apparatus the combination, substantially as set forth, of a signal for the car, a plurality of movable contact devices, which devices are connected in "series," a plurality of local contact devices, each of which is connected with its own circuit-closing device, and connections between the signal for the car, the circuit-closing devices, the movable contact devices and the local contact devices, whereby the signal for the car may be actuated by the movement of any one of the movable contact devices over its corresponding local contact device upon actuating its circuit-closing device, when the car is moving in a given direction.

2. In an elevator signal apparatus the combination, substantially as set forth, of a signal for the car, a plurality of movable contact devices separate from the car, which devices are connected in "series," means for moving such devices, a plurality of local contact devices corresponding in number with the movable devices, each of which is connected with its own circuit-closing device, and connections between the signal for the car, the local circuit-closing devices, the movable contact devices and the local contact devices, whereby the signal for the car may be actuated by the movement of any of the movable contact devices over its corresponding local contact device upon actuating its circuit-closing device, when the car is moving in a given direction.

3. In an elevator signal apparatus the combination, substantially as set forth, of a signal for the car, a plurality of movable contact devices which are connected in "series" and are flexibly connected with the rest of the apparatus, mechanism for moving said devices, a plurality of local contact devices, each of which is connected with its own circuit-closing device, and connections between the signal for the car, the circuit-closing devices, the movable contact devices and the local contact devices, whereby the signal for the car may be actuated by the movement of any one of the movable contact devices over its corresponding local contact device upon actuating its circuit-closing device, when the car is moving in a given direction.

4. In an elevator signal apparatus the combination, substantially as set forth, of a signal for the car, a plurality of movable contact devices movable proportionately with the car which devices are connected in "series," mechanism for moving said devices, a plurality of local contact devices, each of which is connected with its own circuit-closing device, and connections between the signal on the car the circuit-closing devices, the movable contact devices, and the local contact devices, whereby the signal on the car may be actuated by the movement of any one of the movable contact devices over its corresponding local contact device upon actuating its circuit-closing device, when the car is moving in a given direction.

5. In an elevator signal apparatus the combination, substantially as set forth, of a plurality of cars, each provided with its own signal, a plurality of movable contact devices for each car, which are connected together in "series," mechanism for moving the movable devices of each car, a plurality of local contact devices for each car, corresponding in number with the movable devices, each of which is connected with a local circuit common to corresponding local contact devices and which is provided with a circuit-closing device and a plurality of signal devices, with connections to corresponding local contact devices, and connection between the signal of each car, its movable contact devices, its local contact devices, corresponding signal devices and circuit-closing devices, whereby the signal in each car and a signal device may be actuated by the movement of any one of its movable contact devices over its corresponding local contact device upon actuating the circuit-closing device connected with such local contact device, when the car is moving in a given direction.

6. In an elevator signal apparatus the combination, substantially as set forth, of a plurality of cars, each provided with its own signal, a plurality of movable contact devices for each car, which are connected together in "series," mechanism for moving the movable contact devices of each car, a plurality of local contact devices for each car, corresponding in number with the movable devices, each of which is connected with a local circuit common to corresponding local contact devices and which is provided with a circuit-closing device and a detent, and connections between the signal of each car, its movable contact devices, its local contact devices, the circuit-closing devices and detents, whereby the signal in each car and a detent may be actuated by the movement of any one of its movable contact devices over its corresponding local contact device upon actuating the circuit-closing device connected with such local contact device, when the car is moving in a given direction.

7. In an elevator signal apparatus the combination, substantially as set forth, of a plurality of cars, each provided with its own signal and a circuit-breaking device, a plurality of movable contact devices for each car, which are connected together in "series," mechanism for moving the movable devices of each car, a plurality of local contact devices for each car, corresponding in number with the movable devices, each of which is connected with a local circuit common to corresponding local contact devices and which is provided with a circuit-closing device, and connections between the signal of each car, the circuit-breaking device of such car, its movable contact devices and its local contact devices, whereby the signal in each car may be made inoperative by operating its circuit-breaking device as any one of its movable contact devices moves over its corresponding local contact device and the circuit-closing device is actuated, when the car is moving in a given direction.

8. In an elevator signal apparatus the combination, substantially as set forth, of a plurality of cars, each provided with its own signal, a plurality of movable contact devices for each car, which are connected together in "series," mechanism for moving the movable devices of each car, a plurality of local contact devices for each car, corresponding in number with the movable devices, each of which is connected with a local circuit common to corresponding local contact devices and which is provided with a circuit-closing device, and connections between the signal of each car, its movable contact devices and its local contact devices, whereby the signal in each car may be actuated by the movement of any one of its movable contact devices over its corresponding local contact device upon actuating the circuit-closing device connected with such local contact devices, when the car is moving in a given direction.

9. In an electric signal apparatus the combination, substantially as set forth, of a plurality of movable contact devices connected together, each device being provided with contacts arranged in two sets and corresponding contacts of each set of the devices being connected together in "series" and connected to a circuit, a plurality of local contact devices adapted to contact with corresponding movable contact devices and connections, whereby the circuit may be completed through the movable devices as such devices move over corresponding local contact devices.

10. In an electric signal apparatus the combination, substantially as set forth, of a plurality of movable contact devices connected together, each device being provided with contacts arranged in two sets, and corresponding sets of the devices being connected together in "series," and connected to a circuit, means adapted to alternately connect the movable devices to the circuit, a plurality of local contact devices adapted to contact with corresponding movable contact devices, and connections, whereby the circuit may alternately be completed accordingly as the movable devices are alternately connected to the circuit and move over corresponding local contact devices.

11. In an electric signal apparatus the combination, substantially as set forth, of a plurality of movable contact devices connected together, each device being provided with contacts arranged in two sets and corresponding sets of the devices being connected together in "series," and connected to a circuit, means adapted to alternately connect the movable devices to the circuit, a plurality of local contact devices, corresponding in number to the movable contact devices arranged to be successively brought into contact with the movable devices as such devices move toward the local contact devices, and connections, whereby the circuit may alternately be completed in successive order as the movable devices move over the local contact devices and the movable devices are alternately connected with the circuit.

12. In an electric signal apparatus the combination, substantially as set forth, of a signal, a local contact device having two sets of two or more contacts, the contacts of each set insulated from each other, a movable contact device having two sets of contacts, two contacts in each set, some of which may be common to both sets of contacts of the local contact device, which movable contacts are insulated from each other and one contact of each set is provided with a conductor which may be intermittently connected with a source of electricity, a switch adapted to so intermittently connect said conductors, a local circuit-closing device, and connections between the signal, the switch, the local contact device, the local circuit-closing device and the conductors of the movable contact device, whereby, upon actuating the local circuit-closing device, the movement of the movable contact device into connection with the local contacts will actuate the signal when moving in a given direction.

13. In an electric signal apparatus the combination, substantially as set forth, of a signal, a local contact device having two sets of two or more contacts, the contacts of each set insulated from each other, a movable contact device having two sets of contacts, one contact of which may be common to both sets, which contacts are insulated from each other and one contact of each set is provided with a conductor which may be alternately connected with a source of electricity, a switch adapted to so alternately connect said conductors, a local circuit-closing device, and connections between the signal, the switch, the local contact device, the local circuit-closing device and the conductors of the movable contact device, whereby, upon actuating the local circuit-closing device, the movement of the movable contact device into connection with the local contacts will actuate the signal when moving in a given direction.

14. In an electric signal apparatus the combination, substantially as set forth, of a signal, a plurality of local contact devices, each having a set of two or more contacts, a plurality of movable contact devices, each having two or more contacts insulated from each other, with corresponding contacts of such devices connected together in "series," one "series" connectible to one pole of a source of electricity and another "series" connected to the other pole, and connections between the signal, the local devices and the connected "series" of corresponding contacts of the movable devices, whereby the movement of any one of the movable contact devices into connection with its corresponding local contact devices will actuate the signal when moving in a given direction.

15. In an electric signal apparatus the combination, substantially as set forth, of a signal, a plurality of local contact devices, each having a set of two or more contacts, a plurality of movable contact devices, each having two or more contacts insulated from each other, with corresponding contacts of such devices connected together in "series," one "series" connectible to one pole of a source of electricity and another "series" connectible to the other pole, local circuit-closing devices, and connections between the signal, the local contact devices, the local circuit-closing devices and the connected "series" of corresponding contacts of the movable devices, whereby, upon actuating either of the local circuit-closing devices the movement of the corresponding movable contact device into connection with its corresponding local contacts will actuate the signal when moving in a given direction.

16. In an electric signal apparatus the combination, substantially as set forth, of a signal, a plurality of local contact devices, each having two sets of contacts, a plurality of movable contact devices, each having four contacts insulated from one another, four conductors connecting corresponding contacts of the several movable devices in "series," one "series" connectible to one pole of a source of electricity and another "series" connectible to the other pole, and connections between the signal, the local contact devices and the conductors connected with the contacts of the movable devices, whereby the movement of any one of the movable contact devices into connection with its corresponding local contact devices will actuate the signal when moving in a given direction.

17. In an electric signal apparatus the combination, substantially as set forth of a signal, a plurality of local contact devices, each having two sets of contacts, a plurality of movable contact devices, each having four contacts insulated from one another, four conductors connecting corresponding contacts of the several movable devices in "series," one "series" connectible to one pole of a source of electricity and another "series" connectible to the other pole, local circuit-closing devices, and connections between the signal, the local contact devices, the local circuit-closing devices, and the conductors connected with the contacts of the movable devices, whereby upon actuating either of the local circuit-closing devices, the movement of the corresponding movable contact device into connection with its corresponding local contact devices will actuate the signal when moving in a given direction.

18. In an electric signal apparatus the combination, substantially as set forth of a movable device movable at a given rate of speed, contacts provided with conductors yieldingly attached to said device, and a stop device, whereby the contacts may be adjusted relatively to the movable device by contact with the stop device.

19. In an electric signal apparatus the combination, substantially as set forth, of a movable device movable at a given rate of speed, contacts provided with conductors yieldingly attached to said device, and two stop devices, whereby the contacts may be adjusted relatively to the movable device in one direction by one stop device and in another direction by the other stop device.

20. In an electric signal apparatus the combination, substantially as set forth, of a movable device movable at a given rate of speed, two or more groups of contacts provided with conductors, each of which is yieldingly attached to said device and a stop device for each group of contacts, whereby each group of contacts may be adjusted relatively to the movable device by contact with its stop device.

21. A circuit-closer for electric signal apparatus, consisting of a traveling device movable relatively to its corresponding car and carrying a plurality of sets of contacts and conductors, which sets correspond to the floors served by the car, the conductors carried thereby electrically connecting such sets with corresponding and relatively fixed contacts of the apparatus at each of such floors, substantially as described.

22. A circuit-closer for electric signal apparatus, consisting of a traveling device movable relatively to its corresponding car and carrying a plurality of sets of contacts and conductors, which sets correspond to the floors served by the car and are so arranged relatively to each other and the sets of contacts at the several floors that only one set carried by the circuit-closer is in electrical contact with its corresponding set at any floor at a time, the conductors carried thereby electrically connecting corresponding contacts of the several sets in "series" and are adapted to connect each "series" with the apparatus, substantially as described.

23. A circuit-closer for electric signal apparatus consisting of a traveling device movable relatively to its corresponding car, which carries a set of contacts and conductors electrically connecting such contacts with corresponding and relatively fixed contacts of the apparatus, and adjusting means, whereby the position of the contacts carried by the traveling device and the relatively fixed contacts may be adjusted, one relatively to the other, substantially as described.

24. A circuit-closer for electric signal apparatus, consisting of a traveling device movable relatively to its corresponding car and carrying a plurality of sets of contacts and conductors, which sets correspond with the floors served by the car, the conductors of each set electrically connecting with corresponding sets of contacts of the apparatus at each of such floors, and adjusting means, whereby each set of contacts carried by the traveling device and the contacts at such floors may be adjusted, one relatively to the other, substantially as described.

25. A circuit-closer for electric signal apparatus, consisting of a traveling device movable in either of two directions in substantially one plane and relatively to its corresponding car and local sets of contacts, which device carries two sets of contacts each of which has two or more contacts which sets are insulated from each other, and conductors, for each set of contacts, which electrically connect with the sets of local contacts of the apparatus, whereby the contacts carried by the traveling device move with such device in substantially the same planes of movement over the local contacts in either of the two directions, substantially as described.

26. In an elevator signal apparatus the combination, substantially as set forth, of a signal mounted on the car, a movable contact device separate from the car movable in two directions in substantially one plane and having contacts alternately connectible to the circuit, mechanism for moving such device, means for alternately connecting the movable device with the circuit, a local contact device provided with contacts arranged in two sections, each of which is in a different portion of the path of movement of the movable contact device, portions of both sections being common to some of the contacts of the movable device, two circuit-closing devices with connections from each device to one of the sections of the local contact device, and connections between the signal for the car, the circuit-closing devices, the movable contact device, the said means and the local contact device, whereby the signal for the car may be actuated by the movement of the movable contact device over the local contact device upon actuating either of the circuit-closing devices accordingly as the car is moving in either of two directions.

27. In an elevator signal apparatus the combination, substantially as set forth, of a signal for the car, a movable contact device separate from the car, movable in two directions in substantially one plane and having contacts alternately connectible to the circuit, mechanism for moving such device, means for alternately connecting the movable device with the circuit, a local contact device provided with contacts arranged in two sets, each of which is in a different portion of the path of movement of the movable contact device, two circuit-closing devices with connections from each device to one of the sets of the local contact device, and connections between the signal for the car, the circuit-closing devices, the movable contact device, the said means and the local contact device, whereby the signal for the car may be actuated by the movement of the movable contact device over the local contact device upon actuating either of the circuit-closing devices accordingly as the car is moving in either of two directions.

28. In an elevator signal apparatus the combination, substantially as set forth, of a signal for the car, a movable contact device, movable in two directions in substantially one plane and having contacts alternately connectible to the circuit, means for alternately connecting the movable device with the circuit, a local contact device provided with contacts arranged in two sets, one ahead of the other in the direction of movement of the movable device, two circuit-closing devices with connections from each device to one of the sets of the local contact device, and connections between the signal for the car, the circuit-closing devices, the movable contact device, the said means and the local contact device, whereby the signal for the car may be actuated by the movement of the movable contact device over the local contact device upon actuating either of the circuit-closing devices accordingly as the the car is moving in either of two directions.

29. In an elevator signal apparatus the combination, substantially as set forth, of a signal for the car, a movable contact device, movable in two directions in substantially one plane and having contacts alternately connectible to the circuit, means for alternately connecting the movable device with the circuit, a local contact device provided with contacts arranged in two sets, one ahead of the other in the direction of movement of the movable device, two circuit-closing devices with connections from each device to one of the sets of the local contact device, two signal devices, one connected with one of such sections and its circuit-closing device and the other connected with the other section and its device, and connections between the signal for the car, said means, the circuit-closing devices and the local contact device, whereby the signal for the car and one of the signal devices may be actuated by the movement of the movable contact device over the local contact device upon actuating either of the circuit-closing devices accordingly as the car is moving in either of two directions.

30. In an elevator signal apparatus the combination, substantially as set forth, of a signal for the car, a movable contact device movable in two directions in substantially one plane and electrically connectible with the signal for the car and provided with a set of two or more contacts, a portion of which is insulated from another portion, a set of local contacts, a portion of which is insulated from another portion, a push-button device, and conductors between the signal for the car, the movable contact device, the local contacts and the push-button device, whereby, upon actuating the push-button device, the movement of the movable contact device into connection with the local contacts will actuate the signal for the car.

31. In an elevator signal apparatus the combination, substantially as set forth, of a signal for the car, a movable contact device movable in two directions in substantially one plane and electrically connectible with the signal for the car and provided with a set of two or more contacts which are fixed relatively to the device, a portion of which contacts is insulated from another portion, a set of local contacts, a portion of which is insulated from another portion, a push-button device, and conductors between the signal for the car, the movable contact device, the local contacts and the push-button device, whereby, upon actuating the push-button device, the movement of the movable contact device into connection with the local contacts will actuate the signal for the car.

32. In an elevator signal apparatus the combination, substantially as set forth, of a signal for the car, a movable contact device movable relatively with a car in two directions and provided with two sets of contact-points, a portion of each set being insulated from another portion, two sets of local contacts, three portions of each set being insulated from each other, two push-button devices, one for each set of local contacts, a detent device for each push-button device, and conductors between the signal for the car, the movable contact device, the local contacts, the push-button devices and the detent devices, electrically connecting the same when the movable contact device is moved over the local contacts in either direction of movement of the car and the current flows from the movable device to the local contacts, push-button devices, the signal for the car and back to such movable device, and also from push-button devices to the detent devices and the signal is operated as the car moves in either direction.

33. In an elevator signal apparatus the combination, substantially as set forth, of a signal for the car, a movable contact device movable relatively with the car in two directions and provided with two sets of contact-points, a portion of each set being insulated from another portion, two sets of local contacts, a portion of each set being insulated from another portion, two push-button devices one for each set of local contacts, and conductors between the signal for the car, the movable contact device, the local contacts and the push-button devices, electrically connecting the same when the movable contact device is moved over the local contacts in either direction of movement of the car and the current flows from the movable device to the local contacts, push-button devices, the signal for the car and back to such movable device, and the signal is operated as the car moves in either direction.

34. In an elevator signal apparatus the combination, substantially as set forth, of two local signals, a movable contact device movable relatively with a car in two directions and provided with two sets of contact-points, a portion of each set insulated from another portion, two sets of local contacts, a portion of each set being insulated from another portion, the two sets being arranged so that a portion of each set engages with the same contact-points of the movable contact device as such device moves in each direction and electrically connects therewith in only one direction of movement, two push-button devices, one for each set of local contacts, and corresponding conductors for each set of local contacts and push-button devices, a circuit being formed from one insulated contact-point of the movable device through a corresponding insulated local contact to the corresponding push-button device, corresponding local signal and a second local contact and its corresponding contact-point of such movable device, and its local signal is operated, as the car moves in either direction.

35. In an elevator signal apparatus the combination, substantially as set forth, of a signal for the car, a movable contact device movable relatively with a car and provided with a set of contact-points, a portion of which is insulated from another portion, a set of local contacts, a portion of which is insulated from another portion, a local signal, a push-button device, and conductors between the signal for the car, the movable contact device, the local contacts, the local signal and the push-button device, electrically connecting the same when the movable contact device is moved over the local contacts and the current flows from the movable device to the local contacts, push-button device, the signal for the car and back to such movable device, and also from the push-button device to the local signal and back to the local contacts, and both signals are operated as the car moves.

36. In an elevator signal apparatus the combination, substantially as set forth, of a signal for the car, a movable contact device movable relatively with the car and provided with a set of contact-points, a portion of which is insulated from another portion, a set of local contacts, a portion of which is insulated from another portion, a push-button device, a detent device therefor, and conductors between the signal for the car, the movable contact device, the local contacts, the push-button device and the detent device, electrically connecting the same when the movable contact device is moved over the local contacts and the current flows from the movable device to the local contacts, push-button device, the signal for the car back to such movable device and also from the push-button device to the detent device, and the signal is operated as the car moves.

37. In an elevator signal apparatus the combination, substantially as set forth, of a signal for the car, a movable contact device movable relatively with the car and provided with a set of contact-points, a portion of which is insulated from another portion, a set of local contacts, a portion of which is insulated from another portion, a local signal, a push-button device, and conductors forming a circuit from one insulated contact-point of the movable device through an insulated local contact to the push-button device, the signal in the car, back to a second contact-point of the movable device, and also from the push-button device to the local signal and a second local contact, whereby upon actuating the push-button device, the movement of the movable contact device over the local contacts will actuate both the signal in the car and the local signal.

38. In an elevator signal apparatus the combination, substantially as set forth, of a signal for the car, a movable contact device movable relatively with the car and provided with a set of contact-points, a portion of which is insulated from another portion, a set of local contacts, a portion of which is insulated from another portion, a push-button device, a detent therefor, means for releasing the detent and conductors forming a circuit from one insulated contact-point of the movable device through an insulated local contact to the push-button device, the signal in the car back to a contact-point of the movable device, and also another circuit from the first-named contact-point of the movable device to a second local contact and thence to the push-button device and through the detent-releasing means, whereby upon actuating the push-button device, the movement of the movable contact device over the set of local contacts will actuate the signal in the car, and then release the detent.

39. In an elevator signal apparatus the combination, substantially as set forth, of a signal for a car a movable contact device movable relatively with the car and provided with a set of contact-points, a portion of which is insulated from another portion, a set of local contacts, a portion of which is insulated from another portion, a push-button device, a detent therefor, means for releasing the detent, and conductors forming a circuit from one insulated contact-point of the movable contact device, which is common to two of the local contacts of one set, through one of such set of local contacts, thence to the push-button device and through the detent-releasing means, whereby, when the push-button has been actuated, the continued movement of the movable device into connection with such local contact the detent-releasing means will be actuated and release the detent.

40. In an elevator signal apparatus the combination, substantially as set forth, of a signal for the car, a movable contact device movable relatively with the car and provided with a set of contact-points, a portion of which is insulated from another portion, a set of local contacts, a portion of which is insulated from another portion, a push-button device, and conductors forming a circuit from one insulated contact-point of the movable device, through an insulated local contact to the push-button device, the signal in the car back to a contact-point of the movable device, whereby, upon actuating the push-button device, the movement of the movable contact device into connection with the local contacts will actuate the signal in the car.

41. In an elevator signal apparatus the combination, substantially as set forth, of a signal for the car, a movable contact device movable relatively with the car and provided with a set of contact-points, a portion of which is insulated from another portion, a set of local contacts, a portion of which is insulated from another portion, a push-button device, and conductors forming a circuit from one insulated contact-point of the movable device through an insulated local contact to the push-button device, the signal in the car back to a second insulated contact-point of the movable device thence through a second insulated local contact to a third contact-point of such movable device, whereby, upon actuating the push-button device, the movement of the movable contact device over the local contacts will actuate the signal in the car.

42. In an elevator signal apparatus the combination, substantially as set forth, of a local signal a movable contact device movable relatively with a car and provided with a set of contact-points, a portion of which is insulated from another portion, a set of local contacts, a portion of which is insulated from another portion, a push-button device, and conductors forming a circuit from one insulated contact-point of the movable device through an insulated local contact to the push-button device, thence to the local signal and a second local contact, to a second contact-point of the movable device, whereby, upon actuating the push-button device the movement of the movable contact device over the local contacts will actuate the local signal.

43. In combination with an elevator-car and mechanism for operating the same, of a traveling tube, suspended in the elevator-shaft, moving relatively with the elevator-car and carrying four conducting-wires, one wire connected to one pole of a signal in the car, another connected to the negative pole of the dynamo or other source of current, and the third and fourth alternately connected to the positive pole of the dynamo or other source of current through an automatic throw-switch controlled with reference to the direction of movement of the elevator-car, but one of these two conductors being in circuit at any time, which said four conductors carried by the tube are severally connected to groups of four contact-surfaces, each group being attached to one of a series of plates fixed to the traveling tube suspended in the elevator-shaft, there being one such plate for each floor of the building; and a group of contact-blocks for each floor fixed at the side of the elevator-shaft, each of such groups of fixed blocks forming contact with one of the plates attached to the suspended tube; and a push-button device located on each floor of the building, each device consisting of two similar sections, one section connected to the circuits operating the signals for the elevator ascending and the other section connected to circuits operating signals for the elevator descending, each section comprising a plunger carrying two conducting-bars, and a detent holding the bars in position to maintain the circuits closed, one bar maintaining electrical connection between three contact points or terminals, one of which terminals is connected to one pole of the signal on the floor of the building on which the push-button is placed, another of which terminals is connected to one pole of the signal in the elevator-car, and a third of which is connected to one of the blocks in the group fixed at the side of the elevator-shaft at the floor where the push-button is placed, and two terminals connected by the other bar separately forming part of a circuit operating a solenoid or electromagnet for releasing the detent of that push-button, and a spring to maintain the circuits broken when the detent is released, substantially as described.

44. In combination with a number of elevator-cars, and mechanism for operating the same, of a traveling tube suspended in the shaft of each elevator, moving relatively with its corresponding elevator-car, and carrying four conducting-wires, one wire connected to one pole of a signal in the corresponding elevator-car, another connected to the negative pole of the dynamo or other source of current, and the third and fourth alternately connected to the positive pole of the dynamo or other source of current through an automatic throw-switch placed in each shaft and controlled with reference to the direction of movement of the corresponding elevator-car, but one of these two conductors being in circuit at any time, which said four conductors carried by each tube are severally connected to groups of four contact-surfaces, each group being attached to one of a series of plates fixed to the traveling-tube suspended in each elevator-shaft, there being one such plate for each floor of the building upon each tube; and a group of contact-blocks for each floor fixed at the side of each elevator-shaft, each of such groups of fixed blocks forming contact with one of the plates, attached to the tube suspended in the shaft of the corresponding elevator-car; and a push-button device located on each floor of the building, each device consisting of two similar sections, one connected to the circuits operating the signals for elevators ascending and the other section connected to circuits operating signals for elevators descending, each section comprising a plunger carrying two conducting-bars and a detent holding the bars in position to maintain the circuits closed, one bar maintaining electrical connections between three contact points or terminals, one of which terminals is connected in multiple to one pole of the signal at the doorway of each elevator on the floor of the building on which the push-button is placed, another of which terminals is connected in multiple to one pole of the signal in each elevator-car, and the third of which is connected in multiple to one of the blocks in each of the groups fixed at the side of the several elevator-shafts at the floor where the push-button is placed, and two terminals connected by the other bar separately forming part of a circuit operating a solenoid or electromagnet for releasing the detent of that push-button, and a spring to maintain the circuits broken when the detent is released, substantially as described.

45. In combination an elevator-car and mechanism for operating the same, of a traveling tube suspended in the elevator-shaft, moving relatively with the elevator-car and carrying four conducting-wires, one wire connected to the one pole of a signal in the car, another connected to the negative pole of the dynamo or other source of current, and the third and fourth alternately connected to the positive pole of the dynamo or other source of current through an automatic throw-switch controlled with reference to the direction of movement of the elevator-car, but one of these two conductors being in circuit at any time, which said four conductors carried by the tube are severally connected to groups of four contact-surfaces, each group being flexibly attached to one of a series of non-conducting plates, there being one such plate for each floor of the building, each plate supported by a frame rigidly fixed to the suspended tube, and fixed stops at either end of the path of travel of each plate automatically adjusting the position of the plate relative to its supporting-frame; and a group of contact-blocks for each floor fixed at the side of the elevator-shaft, each of such groups of fixed blocks forming contact with one of the plates attached to the suspended tube; and a push-button device located on each floor of the building, each device consisting of two similar sections, one connected to the circuits operating the signals for the elevator ascending and the other section connected to circuits operating signals for the elevator descending, each section comprising a plunger carrying two conducting-bars, and a detent holding the bars in position to maintain the circuits closed, one bar maintaining electrical connection between three contact points or terminals, one of which terminals is connected to one pole of the signal on the floor of the building on which the push-button is placed, another of which terminals is connected to one pole of the signal in the elevator-car, and the third of which is connected with one of the blocks in the group fixed at the side of the elevator-shaft at the floor where the push-button is placed, and two terminals connected by the other bar separately forming part of a circuit operating a solenoid or electromagnet for releasing the detent of that push-button, and a spring to maintain the circuits broken when the detent is released, substantially as described.

46. In combination with a number of elevator-cars and mechanism for operating the same, of a traveling tube suspended in the shaft of each elevator, moving relatively with its corresponding elevator-car and carrying four conducting-wires, one wire connected to one pole of the signal in the corresponding elevator-car, another connected to the negative pole of the dynamo or other source of current, and the third and fourth alternately connected to the positive pole of the dynamo or other source of current through an automatic throw-switch placed in each shaft and controlled with reference to the direction of movement of the corresponding elevator-car, but one of these two conductors being in circuit at any time, which said four conductors carried by each tube are severally connected to groups of four contact-surfaces, each group being flexibly attached to one of a series of non-conducting plates, there being one such plate for each floor of the building on each tube, each plate supported by a frame rigidly fixed to the suspended tube, and fixed stops at either end of the path of travel of each plate automatically adjusting the position of the plate relative to its supporting-frame; and a group of contact-blocks for each floor fixed at the side of each elevator-shaft, each of such groups of fixed blocks forming contact with one of the plates attached to the tube suspended in the shaft of the corresponding elevator-car; and a push-button device located on each floor of the building, each device consisting of two similar sections, one connected to the circuits operating the signals for elevators ascending, and the other section connected to circuits operating signals for elevators descending, each section comprising a plunger carrying two conducting-bars, and a detent holding the bars in position to maintain the circuits closed, one bar maintaining electrical connection between three contact points or terminals, one of which terminals is connected in multiple to one pole of the signal at the doorway of each elevator on the floor of the building on which the push-button is placed, another of which terminals is connected in multiple to one pole of the signal in each elevator-car, and the third of which is connected in multiple to one of the blocks in each of the groups fixed at the side of the several elevator-shafts at the floor where the push-button is placed, and two terminals connected by the other bar separately forming part of a circuit operating a solenoid or electromagnet for releasing the detent of the push-button, and a spring to maintain the circuits broken when the detent is released, substantially as described.

47. A circuit-closer for electric signaling devices for elevators, consisting of a traveling rod or tube moving relatively and proportionately with its corresponding elevator-car and carrying insulated conductors severally joining together similarly-situated contact-points flexibly placed upon each of a series of plates fixed to the tube and corresponding to each floor of the building, each plate supported by a surrounding frame to which it is relatively adjustable by longitudinal movement when in contact with a fixed stop at the end of its path of travel, substantially as described.

48. A circuit-closer for electric signaling devices for elevators, consisting of a traveling rod or tube moving relatively and proportionately with its corresponding elevator-car and carrying insulated conductors severally joined together similarly-situated contact-points flexibly placed upon each of a series of plates fixed to the tube and corresponding to each floor of the building, each plate supported by a surrounding frame to which it is relatively adjustable by longitudinal movement when in contact with a fixed stop at the end of its path of travel; the group of contact-points upon each plate severally forming contacts with a corresponding group of contact-surfaces fixed at the corresponding floor of the building, the fixed and moving contacts corresponding to any floor being in contact only when the corresponding elevator-car is approaching the floor of that building, substantially as described.

HENRY PEDERSEN.

Witnesses:
ERNEST W. STRATMANN,
LEWIS J. ANGEVINE.